United States Patent
Muhlhoff et al.

(10) Patent No.: US 10,272,726 B2
(45) Date of Patent: Apr. 30, 2019

(54) TIRE INCLUDING A HIGH-CONTRAST TEXTURE IN A GROOVE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Olivier Muhlhoff, Clermont-Ferrand (FR); Stéphanie Cambon, Clermont-Ferrand (FR); Hélène Emorine, Clermont-Ferrand (FR); Arnaud Larregain, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 245 days.

(21) Appl. No.: 15/122,883

(22) PCT Filed: Mar. 10, 2015

(86) PCT No.: PCT/EP2015/054935
§ 371 (c)(1),
(2) Date: Aug. 31, 2016

(87) PCT Pub. No.: WO2015/135928
PCT Pub. Date: Sep. 17, 2015

(65) Prior Publication Data
US 2017/0072749 A1    Mar. 16, 2017

(30) Foreign Application Priority Data
Mar. 10, 2014  (FR) ..................... 14 51917

(51) Int. Cl.
*B60C 11/13* (2006.01)
*B60C 11/00* (2006.01)
(Continued)

(52) U.S. Cl.
CPC ...... *B60C 11/1353* (2013.01); *B29C 33/3842* (2013.01); *B29D 30/0606* (2013.01);
(Continued)

(58) Field of Classification Search
CPC ............ B60C 11/13; B60C 11/1353; B60C 2011/1361; B60C 11/03; B60C 2011/0341; B60C 11/0309
(Continued)

(56) References Cited

U.S. PATENT DOCUMENTS 2,268,344 A * 12/1941 Shesterkin .......... B60C 11/0309
                                                    152/209.18
3,706,334 A * 12/1972 Hoke .................... B60C 11/042
                                                    152/209.18
(Continued)

FOREIGN PATENT DOCUMENTS

DE    10 2009 044 123    3/2011
EP         0 868 955     10/1998
(Continued)

OTHER PUBLICATIONS

JP 10-76810, English language machine translation [www.epo.org]. (Year: 1998).*

*Primary Examiner* — Eric Hug
(74) *Attorney, Agent, or Firm* — Cozen O'Connor (57) ABSTRACT

A tire made of rubber material, comprising a tread (2), said tread (2) having a plurality of grooves (21), each groove (21, 23) having a groove bottom, walls flanking the groove bottom and transition regions between the walls and the groove bottom. The tire is characterized in that all or some (Continued)

of the grooves (21, 23) comprise a texture (3) extending only over the groove bottom and over at least a part of the transition regions associated with this groove bottom, said texture (3) contrasting with the rest of the tire (2).

11 Claims, 6 Drawing Sheets

(51) Int. Cl.
    *B29C 33/38*     (2006.01)
    *B29D 30/06*     (2006.01)
    *B29L 30/00*     (2006.01)

(52) U.S. Cl.
    CPC ...... *B60C 11/00* (2013.01); *B29D 2030/0607* (2013.01); *B29L 2030/002* (2013.01); *B60C 2011/1361* (2013.01)

(58) Field of Classification Search
    USPC .......................... 152/209.18, 209.22, 154.2
    See application file for complete search history.

(56) References Cited

U.S. PATENT DOCUMENTS

| | | |
|---|---|---|
| 2008/0105348 A1 | 5/2008 | Byrne et al. |
| 2009/0218019 A1* | 9/2009 | Paturle ................ B29C 33/424 152/209.18 |
| 2011/0125465 A1 | 5/2011 | Buresh |
| 2013/0112326 A1* | 5/2013 | Mellara .................. B60C 11/13 152/209.19 |

FOREIGN PATENT DOCUMENTS

| | | |
|---|---|---|
| EP | 1 641 580 | 4/2006 |
| JP | 10-76810 | * 3/1998 |
| JP | H10 76810 | 3/1998 |
| KR | 2013 0046188 | 5/2013 |
| WO | WO 2013/100199 | 7/2013 |

\* cited by examiner

TIRE INCLUDING A HIGH-CONTRAST TEXTURE IN A GROOVE

RELATED APPLICATIONS

This is a U.S. National Phase Application under 35 USC 371 of International Application PCT/EP2015/054935 filed on Mar. 10, 2015.

This application claims the priority of French application no. 1451917 filed Mar. 10, 2014, the entire content of which is hereby incorporated by reference.

FIELD OF THE INVENTION

The present invention relates to a motor vehicle tire having a tread, this tread having a plurality of grooves.

BACKGROUND OF THE INVENTION

In order to mould the tread of a tire, it is known practice to use moulding elements fixed in a mould. What is meant by a moulding element is any element of the mould which has a moulding surface that allows part of the tread of a tire to be moulded. A moulding element can thus be a block fitted on a segment of the mould or else a rib attached to the radially inner surface of the mould.

It is possible to create a moulding element using a selective fusion method more commonly referred to as sintering. This method uses a beam of energy to fuse a metallic powder. A "beam of energy" means electromagnetic radiation (for example a laser beam) or a beam of particles (for example an electron beam).

A sintering method using a laser, referred to below as a laser sintering method, is known from document EP1641580. In that document, a first layer of metallic powder is spread on a plate. All or some of the particles of this first layer of powder are then agglomerated by the beam of a laser according to the shape of the object that is to be obtained. Once this step has been performed, a second layer of powder is spread on the first layer of powder so that it can be selectively fused in turn using the laser. By repeating these operations of spreading a layer and fusing using a laser, a sintered object is built up layer by layer.

Such a sintered object is shown notably in FIG. 3 of document EP0868955. In that figure, the layered structure of the sintered object is easily distinguished, said sintered object being a moulded element intended to be attached inside a mould for a tire. However, this layered structure causes level lines which are the mirror image of this structure to appear in the grooves of the moulded tire. This phenomenon of level lines is augmented by the curvilinear nature of the mould. These level lines give the tire an unattractive appearance.

There is thus a need to provide a solution that makes it possible to keep using the laser sintering method in order to manufacture the mould for moulding the tire, while attempting to improve the appearance of the tire.

Definitions

A "tire" means all types of resilient tread, whether or not it is subjected to an internal pressure.

A "rubber material" means a diene elastomer, that is to say, in a known way, an elastomer which is based, at least partially (i.e. is a homopolymer or a copolymer), on diene monomers (monomers bearing two conjugated or non-conjugated carbon-carbon double bonds).

The "tread" of a tire means a quantity of rubber material delimited by lateral surfaces and by two main surfaces, one of which, referred to as the tread surface, is intended to come into contact with a road surface when the tire is being driven on.

A "texture" means a set of organized elements.

The "sidewall" of a tire means a lateral surface of the tire, said surface being disposed between the tread of the tire and a bead of this tire.

A "strand" means a filiform element, the height of which is at least equal to twice the diameter of a disc having the same surface area as the mean cross section of the strand.

"Lamellae" means elongate strands which have a length at least equal to twice their height.

SUMMARY OF THE INVENTION

One aspect of the invention relates to a tire made of rubber material, comprising a tread, said tread having a plurality of grooves, each groove having a groove bottom, walls flanking the groove bottom and transition regions between the walls and the groove bottom. All or some of the grooves comprise a texture extending only over the groove bottom and over at least a part of the transition regions associated with this groove bottom, said texture contrasting with the rest of the tire.

By using a texture in all or some of the grooves of the tread, the presence of level lines in the bottom of the grooves is concealed.

In a preferred embodiment, the texture has a lightness, known as first lightness $L^*1$, of between 6 and 15, and preferably between 8 and 9, and the rest of the tire has a lightness, known as second lightness $L^*2$, greater than or equal to 18 and less than or equal to 30.

In this way, it is possible to ensure that the texture contrasts strongly with the rest of the tire. "Lightness" means the parameter which characterizes the capacity of a surface to reflect light. Lightness is expressed here using a scale that ranges from 0 to 100 in accordance with the $L^*a^*b^*$ colour model adopted in 1976 by the International Commission on Illumination (CIE). The value 100 represents white or total reflection; the value 0 represents black or total absorption.

The lightness values $L^*1$ and $L^*2$ are determined using a spectrocolorimeter, for example a KONICA-MINOLTA CM 700D spectrocolorimeter. This appliance is positioned over the texture and the lightness $L^*1$ of this texture is measured directly. This measurement is taken notably using the SCI (specular component included) mode, set at an angle of 10° and with a D65 type light setting (setting as defined by the CIE).

In the same way, the appliance is positioned over another part of the tire in order to determine a lightness $L^*2$. In order to improve the determination of this lightness $L^*2$, it is possible to take a plurality of measurements on the tire and deduce a mean lightness associated with the rest of the tire therefrom. It will be noted that the rest of the tire consists of the regions of the tire that are not covered with the texture according to the invention, for example the surface of the tread of the tire or the sidewall of this tire.

In one non-limiting embodiment, the groove extends transversely through the tread and leads onto a shoulder region of the tire, the texture extending onto this shoulder region in continuation of the groove.

It is thus possible to shorten the lengths of the transverse grooves leading onto the shoulder region of the tire, while suggesting the presence of these grooves in the rest of the shoulder region by way of the texture. Specifically, the applicant has found that reducing the presence of the grooves in the shoulder region makes it possible to limit certain aerodynamic torque loads that result in rolling resistance. The texture which extends in continuation of the transverse groove makes it possible to preserve the aesthetic appearance brought about by a groove when it extends more widely over the shoulder region. This texture generates fewer aerodynamic torque loads than a groove.

In a first non-limiting embodiment, the texture comprises a plurality of elements that protrude from the bottom of the grooves and from the associated transition regions.

The texture formed by the protruding elements provides a twofold advantage. Firstly, this texture makes it possible to "trap" all or some of the incident light rays that strike the grooves of the tread. This makes it possible to give the grooves a blacker appearance and consequently this makes it possible to improve their contrast and thus their visibility with respect to the rest of the tire. This particular texture therefore makes it possible to obtain a visual effect of the "velvet" type. Finally, the texture used has hydrophobic properties, making the evacuation of water, dust or mud from the groove easier.

In one non-limiting variant embodiment, at least 30% of the protruding elements form an angle a of greater than 40° with respect to a plane tangent to the bottom of the grooves, and at most 25% of the protruding elements of the texture form an angle a of less than 20° with respect to the tangent plane. In this way, the capacity of the texture to trap light is improved further.

In one non-limiting variant embodiment, all or some of the protruding elements are strands distributed through the texture at a density at least equal to one strand per square millimeter (mm$^2$), each strand having a mean cross section of between 0.003 mm$^2$ and 1 mm$^2$.

In another non-limiting variant embodiment, all or some of the protruding elements are substantially mutually parallel lamellae, the spacing of the lamellae in the texture being at most equal to 0.5 mm, each lamella having a mean width of between 0.03 mm and 0.25 mm.

In another non-limiting variant embodiment, all or some of the protruding elements form parallelepipeds having a side length of between 0.05 mm and 0.5 mm and a height of between 0.05 mm and 0.5 mm, the distance between two adjacent parallelepipeds in the texture being between 0.05 mm and 0.5 mm.

In another non-limiting variant embodiment, the protruding elements have variable shapes and distances between protruding elements in the texture.

In a second non-limiting embodiment, the texture has a plurality of elements that are recessed into the bottom of the grooves and into the associated transition regions, the recessed elements forming openings in the bottom of the grooves and in the associated transition regions, the texture comprising a plurality of openings, these openings being distributed through the texture at a density at least equal to one opening per square millimeter (mm$^2$), these openings having equivalent diameters of between 0.03 mm and 1.2 mm.

The texture is thus more durable. Specifically, since this texture is made up of elements that are recessed into the bottom/transition regions of the grooves, the impact of rubbing against stones is reduced.

In one variant embodiment, at least one of the grooves of the plurality of grooves has, in cross section, an undulating overall shape in the depth of the tread, with entirely open groove portions at the tread surface and completely or partially closed groove portions at this tread surface. The texture extends through the open portions and the closed portions of the groove.

BRIEF DESCRIPTION OF THE DRAWINGS

Other features and advantages of the invention will become apparent from the following description, given by way of non-limiting example, with reference to the attached drawings in which.

DETAILED DESCRIPTION OF THE DRAWINGS

In the following description, elements which are substantially identical or similar will be denoted by identical references.

Figure 1:
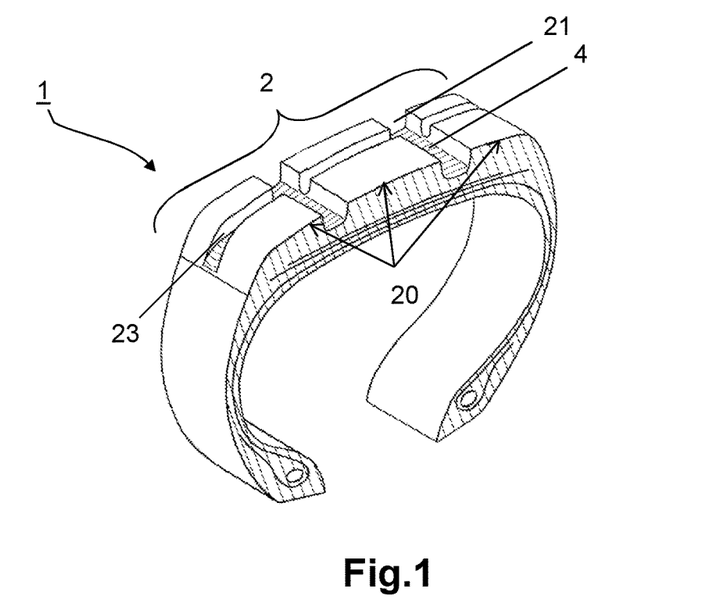
FIG. 1 schematically shows a perspective view of a part of a tire having a tread in accordance with the prior art.

FIG. 1 shows a part of the tire 1 having a tread 2 according to the prior art. As can be seen, the tread 2 has a tread surface 20 and grooves 21, 23. The tread surface 20 (also known as the useful region) is intended to come into contact with a road surface when the tire 1 is being driven on. The grooves 21, 23 (also known as tread patterns) make it possible notably to evacuate water and thereby improve the grip of the tire 1 on a wet road surface. On account of the laser sintering method used, the grooves have level lines 4 notably at their bottom.

Figure 2:
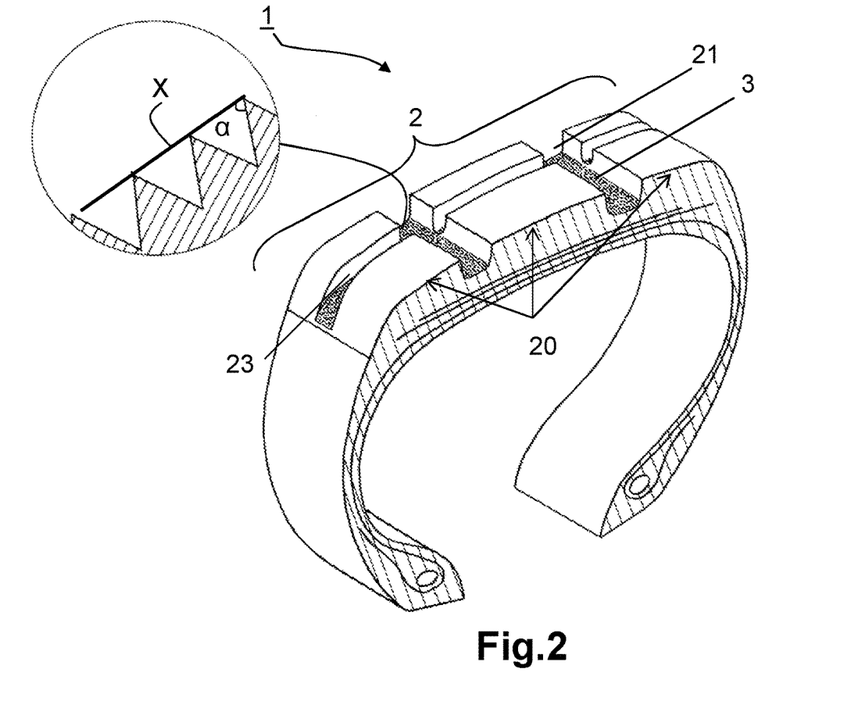
FIG. 2 schematically shows a perspective view of a part of a tire having a particular texture at the bottom of the grooves of the tread and in the associated transition regions, according to the invention.

FIG. 2 shows a part of the tire 1 having a tread 2 according to the invention. The tread 2 has a tread surface 20 and a plurality of grooves 21, 23, circumferential grooves 21 and transverse grooves 23.

Figure 3:
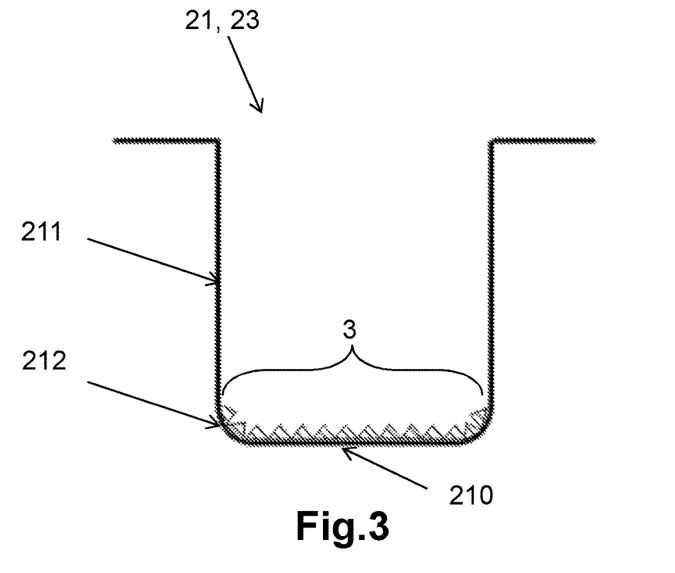
FIG. 3 schematically shows a view in cross section of a groove of the tread from FIG. 2 with the particular texture.

As illustrated in the view in cross section of a groove 21 in FIG. 3, each groove 21, 23 has a groove bottom 210, walls 211 flanking the groove bottom 210 and transition regions 212 (also known as connecting regions) between the walls 211 and the groove bottom 210, these regions 212 being curved and having a radius of around 1 mm in one non-limiting example. It will be noted that the texture 3 is illustrated schematically in a groove 21, 23 in a zoomed-in view. It will also be noted that the wall 211 is shown here as extending perpendicularly to the bottom 210 of the groove. In a variant, this wall 211 may be at an angle other than 90° with respect to the bottom 210.

As illustrated in FIG. 2 and in FIG. 3, all or some of the grooves 21, 23 comprise a texture 3 extending only over the groove bottom 210 and over at least a part of the transition regions 212 associated with this groove bottom, said texture 3 contrasting with the rest of the tire 2. "At least a part of a transition region" means that the texture extends over at least 25% of the surface of this transition region. The texture 3 does not extend over the walls 211 of the groove 21, 23. The texture 3 is thus absent from the walls 211.

The texture 3 thus makes it possible to conceal the level lines on the bottom, the level lines on the bottom being particularly visible to a person looking at the tire. Furthermore, the fact that the texture 3 is disposed in the grooves 21, 23 makes it possible to give said texture 3 greater durability. Specifically, the impact of mechanical attack on the texture, such as rubbing against stones, is low. It will be noted that the fact that the texture 3 is also present in the transition regions 212 of the grooves 21 makes it possible to improve the impression of depth provided by the texture 3 in the groove.

Figure 4:
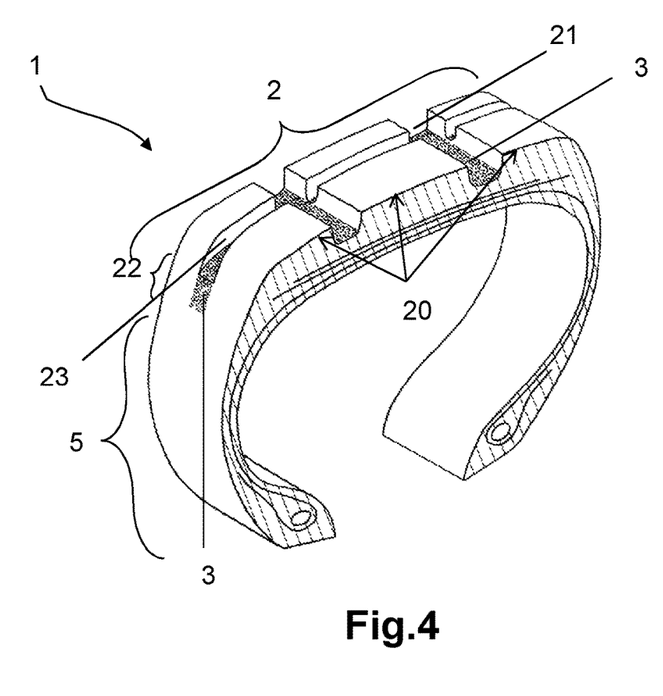
FIG. 4 schematically shows a perspective view of a part of a tire from FIG. 2, having a particular texture at the bottom of the grooves of the tread and in the associated transition regions, said texture extending over the tire according to a non-limiting embodiment.

FIG. 4 shows a part of the tire 1 having a tread 2 in which, according to one non-limiting embodiment, grooves 23 extend transversely through the tread 2 and lead onto a shoulder region 22 of the tire, the texture 3 extending onto this shoulder region 22 in continuation of the transverse grooves 23.

It will be recalled that the shoulder region 22 is a transition region between the tread surface 20 of the tire 1 and the sidewall 5 of the tire 1. The shoulder region 22 is not intended to come into contact with the road surface when the tire 1 is running in a straight line. The shoulder region 22 has grooves 23 which are transverse grooves of the tread 2.

As can be seen in the figure, a transverse groove 23 which leads onto the shoulder region 22 is illustrated. The texture 3 covers not only the bottom 210 and the transition regions 212 of this transverse groove 23, but also covers a part of the tire which extends beyond this groove 23, namely a part of the shoulder region 22 which is situated in continuation of said groove 23. There is thus continuity in the texture 3 which covers the bottom 210 of the groove 23 and which covers the shoulder region 22 no longer having the groove 23.

This embodiment makes it possible to reduce the size of the transverse grooves 23 leading onto the shoulder region 22 while retaining an aesthetic appearance of the tire for an observer. Specifically, when the transverse grooves 21 are too long and thus extend too far into the shoulder region 22, this causes problems of friction and an increase in the rolling resistance. Furthermore, in order to preserve the aesthetic appearance brought about by the transverse grooves in the shoulder region 22 (the region of the tire that is visible to an observer) while reducing the size of said grooves, the part of each transverse groove 23 which has been removed is replaced with the texture 3 of the "velvet" type in continuation of said transverse grooves.

According to a first non-limiting embodiment of the texture 3, the texture 3 comprises a plurality of elements that protrude from the bottom 210 of the grooves and from the associated transition regions 212. The effect of these protruding elements is to "trap" a large amount of the incident light rays that strike the texture 3. In this first embodiment, the texture 3 (known as "velvet") makes it possible to obtain a visual appearance of the "velvet" type since the protruding elements absorb light and thus make the grooves 21 blacker. It will be noted that because the texture 3 is not attached to the walls 211 of the grooves 21, 23, this improves the depth effect of the tread. Owing to their structure and the fact that they are "inlaid" in the grooves 21, 23, these protruding elements furthermore make it possible to evacuate water, mud and dust more easily from the grooves 21.

According to one non-limiting variant embodiment, at least 30% of the protruding elements of the texture 3 form an angle α of greater than 40° with respect to a plane X tangent to the bottom of the grooves 210, and at most 25% of the protruding elements of the texture form an angle a of less than 20° with respect to the tangent plane X. The protruding elements, said tangent plane X and said angle α are illustrated schematically in the zoomed-in part of the texture 3 in FIG. 2. It will be noted that the angle α is the angle between the tangent plane X and the side of the protruding elements. This variant is applicable to the protruding elements 6 and 7 described below. In the same way, when the texture extends onto a transition region 212, the tangent plane is determined with respect to this transition region 212.

Figure 5:
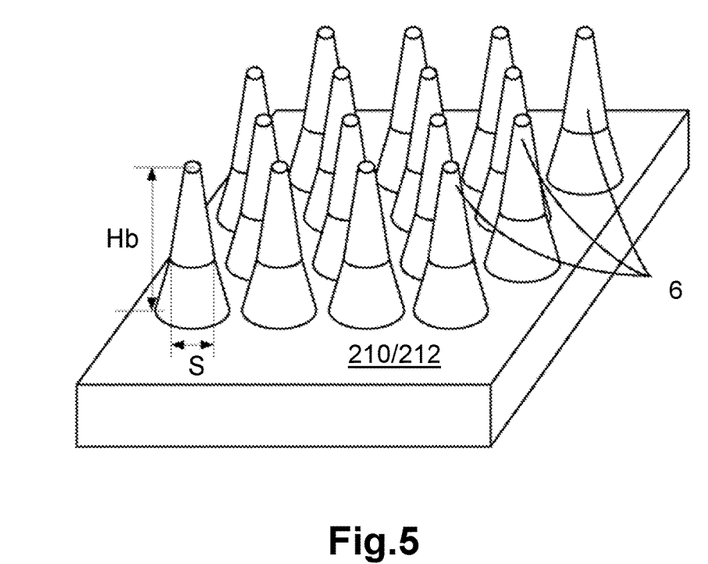
FIG. 5 shows a part of the texture from FIG. 2, according to a first variant embodiment of a first embodiment of said texture, according to which the texture has protruding elements.

FIG. 5 illustrates the texture 3 according to a first non-limiting variant embodiment of the first embodiment. In this variant, all or some of the protruding elements are strands 6 distributed through the texture 3 at a density at least equal to one strand per square millimeter ($mm^2$), each strand having a mean cross section S of between 0.003 $mm^2$ and 1 $mm^2$. It will be noted that the mean cross section of each strand corresponds to the mean of the cross sections S measured at regular intervals from the base of the strand. The strands 6 have a conical overall shape with a cross section that decreases over the height Hb of these strands.

Figure 6:
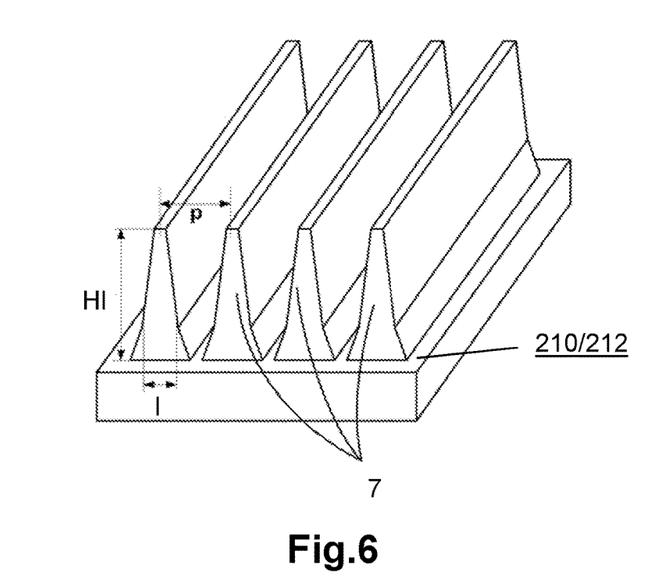
FIG. 6 shows a part of the texture from FIG. 2, according to a second variant embodiment of a first embodiment of said texture, according to which the texture has protruding elements.

FIG. 6 illustrates the texture 3 according to a second non-limiting variant embodiment of the first embodiment. In this variant, all or some of the protruding elements are substantially mutually parallel lamellae 7, the spacing P of the lamellae in the texture being between 0.1 mm and 0.5 mm, each lamella 7 having a mean width of between 0.03 mm and 0.25 mm. It will be noted that the mean width corresponds to the mean of the widths l measured at regular intervals over the height Hl of the lamella, the height of each lamella being between 0.05 and 0.5 mm.

In another variant embodiment, the texture has a combination of strands 6 and lamellae 7.

Figure 7:
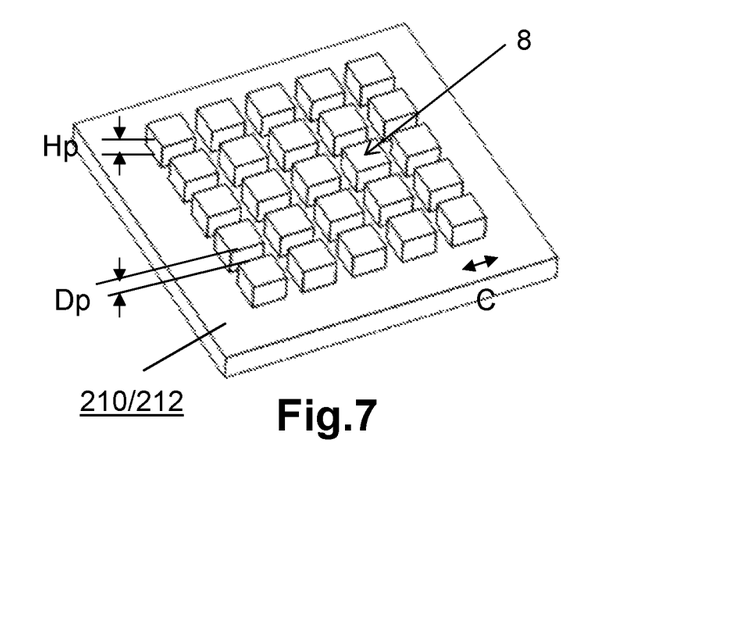
FIG. 7 shows a part of the texture from FIG. 2, according to a third variant embodiment of a first embodiment of said texture, according to which the texture has protruding elements.

FIG. 7 illustrates the texture 3 according to a third non-limiting variant embodiment of the first embodiment. In this variant, all or some of the protruding elements form parallelepipeds 8 having a side length C of between 0.05 mm and 0.5 mm and a height Hp of between 0.05 mm and 0.5 mm, the distance Dp between two adjacent parallelepipeds 8 in the texture being between 0.05 mm and 0.5 mm.

In another variant embodiment, the texture has a combination of elements in relief 6, 7 and 8, or 6 and 8, or 7 and 8 described above.

Figure 8:
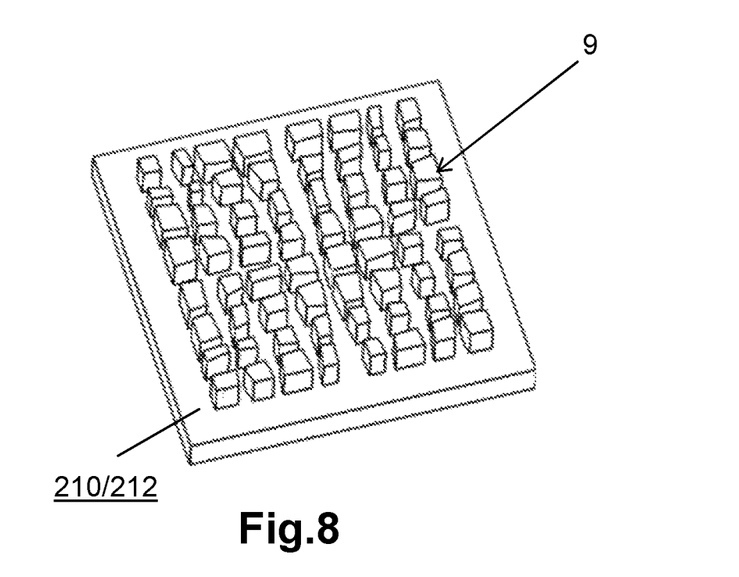
FIG. 8 shows a part of the texture from FIG. 2, according to a fourth variant embodiment of a first embodiment of said texture, according to which the texture has protruding elements.

FIG. 8 illustrates the texture 3 according to a fourth non-limiting variant embodiment of the first embodiment. In this variant, the protruding elements 9 have variable shapes and distances between protruding elements in the texture 3. This variant makes it possible to improve the aesthetic appearance of the texture 3.

According to a second non-limiting embodiment of the texture 3, the texture 3 comprises a plurality of elements 10 (also known as holes) that are recessed into the bottom 210 of the grooves and into the associated transition regions 212. The recessed elements 10 are made up of openings 11 in the bottom 210 and in the transition regions 212, and of associated cavities 12 that extend into the depth of the bottom 210 and into the depth of the associated transition regions 212.

Thus, the texture 3 has a plurality of openings 11 in the bottom 210 of the grooves and in the associated transition regions 212, said openings 11 being distributed through the texture 3 at a density at least equal to one opening per square millimeter (mm$^2$) and having (in the bottom and in the transition regions) equivalent diameters Dt of between 0.03 mm and 1.2 mm.

In one non-limiting embodiment, the openings 11 occupy at least 30% of the texture 3.

According to other non-limiting embodiments, the openings 11 occupy at least 50% of the texture 3, or even more than 70%. It will be noted that the greater the rate of occupation of the texture by the openings, the better the concealment of the level lines brought about by the moulding method is, and the better this texture contrasts with the rest of the tread (notably with the tread surface, with the shoulder region or with the sidewall).

The openings 11 continue into the depth of the bottom 210 of the grooves and into the depth of the transition regions 212 of the grooves so as to form cavities 12.

The effect of these cavities 12 is to "trap" a large amount of the incident light rays that strike the texture 3. Specifically, since the cavities 12 are recessed into the bottom 210 and into the transition regions 212, the impact of mechanical attack on the texture, such as rubbing against stones, is lower than for protrusions. In this second embodiment, the texture 3 (known as "velvet") makes it possible to obtain a visual appearance of the "velvet" type since the cavities absorb light and thus make the bottom 210 of the grooves 21 blacker. The visual effect of the grooves is improved.

In one non-limiting embodiment, all or some of the cavities 12 have a depth at least equal to 0.1 mm. In one non-limiting variant embodiment, all or some of the cavities 12 have a depth of between 0.2 mm and 0.6 mm. This ensures that a large amount of incident light rays that strike the texture 3 are trapped by said texture and, since the depth of the cavities is limited, also prevents the mechanical strength of the grooves 21 from deteriorating excessively.

Figure 9:
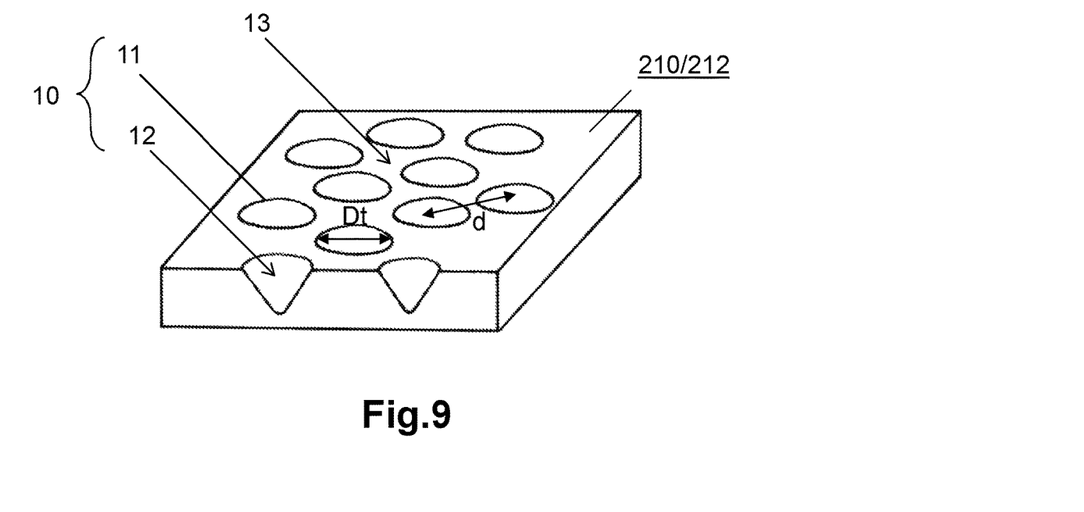
FIG. 9 shows a part of the texture from FIG. 2, according to a second embodiment of said texture, according to which the texture has recessed elements.

FIG. 9 illustrates the texture 3 according to a first non-limiting variant of this second embodiment. In this variant, all or some of the cavities 12 are in the form of cones which extend into the depth of the bottom 210 and of the transition regions 212 of the grooves 21 and lead onto the surface of said bottom 210 and of said transition regions 212, forming circular openings 11. The cavities 12 thus have a cross section which decreases with depth. This improves the contrast of the texture 3 and thus of the bottom 210 and of the transition regions 212 with respect to the rest of the tread 2. It will be noted that in this variant, the openings 11 of the cavities 12 are not in contact. The openings 11 are separated by intermediate regions 13. Moreover, the openings 11 are distributed regularly over the bottom 210 of the grooves 21, 23 such that the distance d between each opening in the texture 3 is similar overall. The same goes for the transition regions 212 of the grooves 21.

Figure 10:
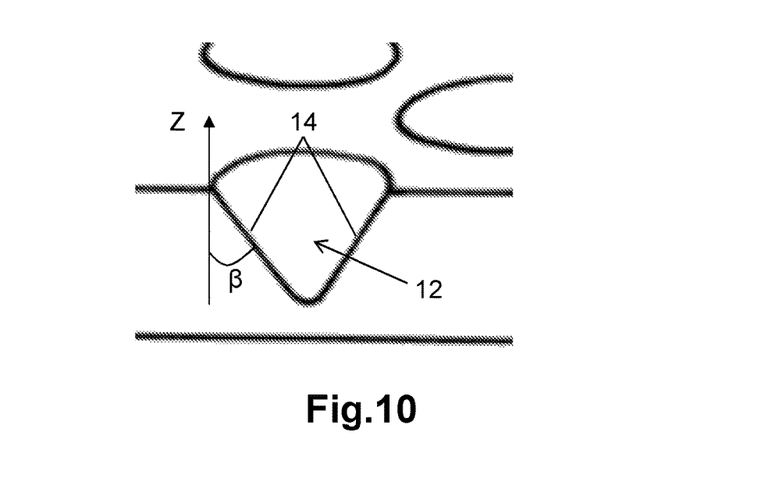
FIG. 10 shows an enlarged view of a cavity of a recessed element of the texture from FIG. 9.

FIG. 10 is a zoomed-in view of a cavity 12 of a recessed element 10 of the texture from FIG. 9. In one non-limiting embodiment, all or some of the cavities have at least one wall 14 which, in cross section, forms an angle β of between 10° and 60° with respect to a direction Z perpendicular to the texture 3.

Each time a light ray strikes a wall 14 of the cavity 12, this ray is reflected by said wall 14. The direction of reflection of the light ray depends on the initial direction of this light ray and on the inclination angle of the wall 14. Thus, depending on this initial direction and on this inclination angle, the light ray can be sent towards another wall 14 of the cavity. By contrast, the light ray can be sent to the outside of the cavity, for example directly towards an observer. In the first case, the light ray is "lost" in the cavity and will no longer be perceptible to an observer. In the second case, the observer can perceive the light ray and the texture can then appear to be lighter and thus to contrast less with the rest of the tread. Choosing a cavity 12 having at least one wall 14 which forms an angle β of between 10° and 60° ensures that a large part of the light rays entering the cavity 12 will be absorbed by this cavity under the effect of multiple reflections inside the cavity. This improves the contrast of the texture 3 (and notably of the bottom 210 of the grooves 21, 23) with respect to the rest of the tire (notably with respect to the sidewall or with respect to the tread surface), while preserving the same rate of occupation of the texture by the cavities. Moreover, with this wall inclination, the strength of the texture is improved overall, notably in the event of repeated rubbing against stones.

Figure 11:
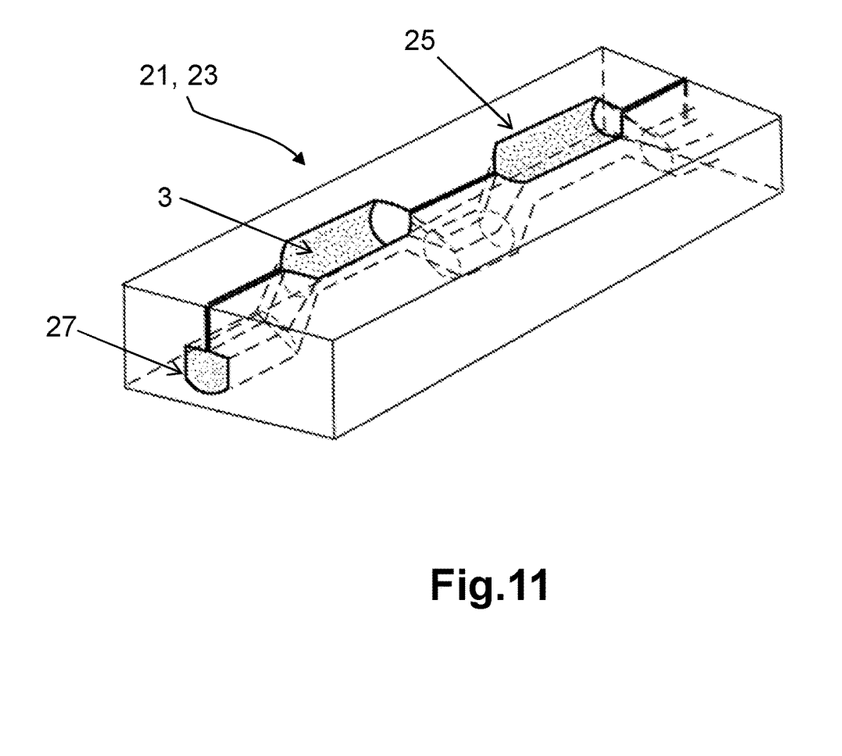
FIG. 11 shows a variant embodiment of a groove having a texture in accordance with the invention.

FIG. 11 shows a variant embodiment in which at least one of the grooves of the plurality of grooves 21, 23 has, in cross section, an undulating overall shape with entirely open groove portions 25 at the tread surface and completely or partially closed groove portions at this tread surface. The texture 3 extends through the open portions 25 and the closed portions 27 of the groove 21, 23.

The invention is not limited to the examples described and shown and various modifications can be made thereto without departing from its scope.

Thus, according to another non-limiting variant embodiment, the lamellae 7 from FIG. 6 can be discontinuous. They have a flat part between one another. They can also have cross-sectional differences between one another. In addition, the lamellae can have curves or angles, notably along their length. They can also have a variable length.

Thus, according to another non-limiting variant embodiment, the openings 11 can have a circular, square or polygonal (for example hexagonal) shape and the corresponding cavities 12 can have a cylindrical, parallelepipedal or polygonal shape. With these two latter structures (square or polygonal), it is possible to more easily organize the openings 11 with respect to one another so as to limit the area of the intermediate regions 13 between these openings. With such opening shapes, it is easier to achieve consistent rates of occupation of the openings.

Thus, in one non-limiting variant embodiment, the continuation of the texture onto the sidewall is present only on the sidewall mounted on the outer side of the vehicle, that is to say the sidewall present on that side of the tire that is visible to a user when the tire is mounted on a vehicle.

Thus, the invention described has notably the following advantages:

The texture 3 makes it possible to conceal the level lines in the grooves 21, 23;

The texture 3 (regardless of whether it has protruding elements and/or recessed elements) makes it possible at the same time to absorb light and thus to give the grooves 21, 23 a blacker appearance compared with the rest of the tread 2. This improves the contrast of the grooves 21 with respect to the rest of the tread;

The texture 3 makes it possible to obtain a visual appearance of the "velvet" type at the grooves 21, 23, this providing an effect of contrast and depth in the grooves 21, 23 such that they appear deeper to an observer;

The continuation of the texture 3 onto the shoulder region 22 makes it possible, if required, to reduce the length of the transverse grooves in the shoulder region. This thus improves the aerodynamic performance of the tire (reduction in aerodynamic torque loads) while maintaining a tire with an aesthetic overall appearance. There is thus less rolling resistance and consequently the fuel consumption is reduced.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire made of rubber material, comprising:
a tread, said tread having a plurality of grooves, each of said grooves having a groove bottom, walls flanking the groove bottom, and transition regions between the walls and the groove bottom,
wherein all or some of the grooves comprise a texture extending only over the groove bottom and over at least a part of the transition regions associated with this groove bottom, said texture contrasting with the rest of the tire, and
the texture has a lightness, known as first lightness $L^*1$, of between 6 and 15, and the rest of the tire has a lightness, known as second lightness $L^*2$, greater than or equal to 18 and less than or equal to 30.

2. The tire according to claim 1, wherein at least one of the grooves extends transversely through the tread and leads onto a shoulder region of the tire, the texture extending onto this shoulder region in continuation of the groove.

3. The tire according to claim 1, wherein the texture comprises a plurality of elements that protrude from the bottom of the grooves and from the associated transition region.

4. The tire according to claim 3, wherein at least 30% of the protruding elements form an angle α of greater than 40° with respect to a plane tangent to the groove, and wherein at most 25% of the protruding elements of the texture form an angle α of less than 20° with respect to this plane tangent to the groove.

5. The tire according to claim 3, wherein all or some of the protruding elements are strands distributed through the texture at a density at least equal to one strand per square millimeter ($mm^2$), each strand having a mean cross section of between 0.003 $mm^2$ and 1 $mm^2$.

6. The tire according to claim 3, wherein all or some of the protruding elements are substantially mutually parallel lamellae, the spacing of the lamellae in the texture being at most equal to 0.5 mm, each lamella having a mean width of between 0.03 mm and 0.25 mm.

7. The tire according to claim 3, wherein all or some of the protruding elements form parallelepipeds having a side length of between 0.05 mm and 0.5 mm and a height of between 0.05 mm and 0.5 mm, the distance between two adjacent parallelepipeds in the texture being between 0.05 mm and 0.5 mm.

8. The tire according to claim 3, wherein the protruding elements have variable shapes and distances between protruding elements in the texture.

9. The tire according to claim 1, wherein the texture has a plurality of elements that are recessed into the bottom of the grooves and into the associated transition regions, the recessed elements forming openings in the bottom of the grooves and in the associated transition regions, the texture comprising a plurality of openings, these openings being distributed through the texture at a density at least equal to one opening per square millimeter ($mm^2$), these openings having equivalent diameters of between 0.03 mm and 1.2 mm.

10. The tire according to claim 1, wherein at least one of the grooves of the plurality of grooves has, in cross section, an undulating overall shape with entirely open groove portions at the tread surface and completely or partially closed groove portions at this tread surface, the texture extending through the open portions and the closed portions of the groove.

11. The tire according to claim 1, wherein the first lightness $L^*1$ is between 8 and 9.

* * * * *